(12) United States Patent
Borgese (10) Patent No.: US 10,588,385 B1
(45) Date of Patent: Mar. 17, 2020

(54) TAG (71) Applicant: MYFAMILY S.R.L., Valenza (AL) (IT)

(72) Inventor: Alessandro Borgese, Valenza (IT)

(*) Notice: Subject to any disclaimer, the term of this patent is extended or adjusted under 35 U.S.C. 154(b) by 0 days.

(21) Appl. No.: 16/372,740

(22) Filed: Apr. 2, 2019

(30) Foreign Application Priority Data

Apr. 5, 2018 (IT) .................. 102018000004221

(51) Int. Cl.
*A44C 25/00* (2006.01)
*A44C 3/00* (2006.01)
*G09F 3/00* (2006.01)
*A01K 27/00* (2006.01)

(52) U.S. Cl.
CPC .......... *A44C 25/001* (2013.01); *A01K 27/006* (2013.01); *A44C 3/001* (2013.01); *G09F 3/005* (2013.01)

(58) Field of Classification Search
CPC ....... A44C 25/001; A44C 3/001; A44C 3/004; A44C 3/008; A01K 27/006; G09F 3/005
See application file for complete search history.

(56) References Cited

U.S. PATENT DOCUMENTS

| | | | | |
|---|---|---|---|---|
| 509,889 A * | 12/1893 | Gaynor | ............... | A44C 25/001 63/23 |
| 1,490,624 A * | 4/1924 | Mitchel | ................. | A44C 3/001 40/1.5 |
| 3,596,380 A * | 8/1971 | Williams | .......... | A44C 17/0258 434/402 |
| 4,183,159 A * | 1/1980 | Isaac | ..................... | A44C 3/001 40/1.6 |
| 4,472,891 A * | 9/1984 | Ielpo | ..................... | A44C 3/004 29/520 |
| 4,604,819 A * | 8/1986 | Grey | ..................... | A44C 3/004 40/1.5 |
| 4,765,154 A | 8/1988 | Martin | | |
| 4,854,133 A * | 8/1989 | Irwin | ..................... | A44C 3/00 63/15 |
| 5,655,271 A * | 8/1997 | Maxwell-Trumble | ..................... | A44C 3/001 24/113 MP |
| 5,676,376 A * | 10/1997 | Valley | ................... | A44C 21/00 273/148 R |
| 5,758,516 A * | 6/1998 | Uematsu | .............. | A44C 15/003 63/1.14 |
| 6,086,965 A * | 7/2000 | Waas-Russiyan | ..... | A44C 3/004 40/1.5 |
| 7,448,485 B1 * | 11/2008 | Rutler | ................... | A44C 21/00 194/214 |

(Continued)

FOREIGN PATENT DOCUMENTS

EP 0415892 3/1991
GB 2011144 7/1979

(Continued)

*Primary Examiner* — Gary C Hoge
(74) *Attorney, Agent, or Firm* — Themis Law (57) ABSTRACT

A tag includes a plate-shaped element and a covering part. The plate-shaped element has a central portion and a peripheral edge, the covering part being superimposed on the plate-shaped element to match at least part of the peripheral edge. The peripheral edge has at least one housing seat of a portion of the covering part. Moreover, the covering part is superimposed to the plate-shaped element at least at said housing seat.

15 Claims, 6 Drawing Sheets

(56) References Cited

U.S. PATENT DOCUMENTS

| | | | |
|---|---|---|---|
| 8,430,403 B1* | 4/2013 | Wright | A63F 3/00697 264/279.1 |
| 8,955,356 B1* | 2/2015 | Smith | A44C 25/001 24/303 |
| 9,439,480 B1* | 9/2016 | French | A44C 5/0015 |
| 10,264,897 B1* | 4/2019 | Chen | A47G 1/16 |
| 2007/0034165 A1* | 2/2007 | Yang | A01K 27/001 119/863 |
| 2007/0157494 A1* | 7/2007 | Barcikowski | A44C 3/001 40/1.5 |
| 2009/0146373 A1* | 6/2009 | Chapet | A44C 21/00 273/148 R |
| 2012/0167836 A1 | 7/2012 | Morris | |
| 2013/0210927 A1* | 8/2013 | Nouvel | A61K 31/11 514/703 |
| 2015/0320156 A1* | 11/2015 | Meisenbach | A44C 25/002 63/1.14 |
| 2016/0136944 A1* | 5/2016 | Greenberg | B41J 3/407 101/4 |

FOREIGN PATENT DOCUMENTS

| | | |
|---|---|---|
| GB | 2376184 | 12/2002 |
| NL | 298146 | 11/1965 |

* cited by examiner

Fig. 6b

TAG

FIELD OF THE INVENTION

The present invention relates to a tag comprising a plate-like element and a covering part.

BACKGROUND OF THE INVENTION

There are various types of tags in the prior art, which have the most disparate uses.

In fact, in the market, there are tags of any shape, of any size and made with different materials, which are used as a jewel, as an accessory, as gadgets, for example in combination with perfumes, or also as actual identification tags.

Regardless of their use, such tags are often made of metal, so as to be able to engrave on the same some engravings reporting writings, drawings or the like, in order to create identification tags.

In this way every tag becomes a unique piece on which a variety of information may be reported, which is the reason why such tags are often used to provide identification tags for pets such as dogs or cats.

The use of two or more tags on the same animal, arranged close to one another, has nevertheless a particularly relevant disadvantage: when animals are walking, in fact, the tags impact each other and, being made of metal, cause annoying noises, both for humans and for animals.

This drawback also occurs in the case where the tags are worn by human beings, for example on the wrist, through the support of bracelets or the like.

In order to overcome this drawback, the tags known in the state of the art provide a covering part that dampens the impacts among tags, thus avoiding the generation of noise.

For this reason, the covering part usually consists of non-metallic material, preferably plastic.

The covering part is therefore functional but often ruins the aesthetic appearance of the tags.

Moreover, the covering part is made from rubber elements which surround the plate-like element, which however are hardly fixable to the plate-like element and which often become loose with wear, generating an unpleasant aesthetic effect.

Moreover, with particular reference to the use of the tags on pets, rubber elements, which can hardly be fixed to the plate-like element, form seats where dirt and external agents can easily penetrate.

There is therefore a need, which is not satisfied by the state of the art, to provide a tag which overcomes the above-described disadvantages.

SUMMARY OF THE INVENTION

The present invention achieves the above objects by providing a tag as previously described, wherein the plate-like element has a central part and a peripheral edge.

The covering part is superimposed on the plate-like element, matching with at least part of the peripheral edge.

In addition, the peripheral edge has at least one housing seat for part of said covering part, in such a way that the covering part is superimposed on the plate-like element at least at said housing seat.

A tag is thus provided wherein the covering part covers the peripheral edge, but at the same time is firmly attached to the plate-like element.

To obtain this configuration, it is possible to use a co-moulding methodology for the material of the covering part on the peripheral edge of the plate-like element.

Advantageously, the plate-like element is made of metallic material, while the covering part is made of plastic material.

Engravings, drawings, or alphanumeric characters of any shape and size can therefore be made on the plate-like element.

The use of plastic material for the covering part allows to obtain a "dampening" effect, aimed at absorbing any vibrations or noise generated from the collision of two or more tags.

This covering also allows a better wear preservation of the tag which, subject to fewer direct stresses, maintains surface colour and sharpness for a longer time.

However, the advantages of the use of plastic material are not only functional; in fact, the co-moulding of the plastic material on the peripheral edge allows to vary the colour, shape and patterns of the covering part, thus obtaining a high variety also from an aesthetic point of view.

Also, on the basis of the selected plastic material, besides varying colours, appearance and shape, it is possible to obtain additional features for the tag object of the present invention.

In fact, in a preferred embodiment variant, the covering part is made of a plastic material comprising a polymeric matrix, a fluid that has odorous substances or aromatic parts being dispersed within such matrix.

Therefore, a scented tag is obtained, which may be worn, both by human beings and by animals, ensure a pleasant aesthetic effect and at the same time release a fragrance.

Another possible use of this embodiment is the creation of gadgets: consider, for example, a perfume package to which the tag, engraved with a dedication or the name of the perfume and having in its covering part the same perfume inside the package, can be associated.

In a similar manner it is possible, for example, to associate the tag object of the present invention to a wine or spirits package.

A possible plastic material that allows to "trap" a perfume inside its own matrix is Pibiflex®, that can be used to produce the covering part. In general, Pibiflex® is a thermoplastic product with high elastomeric properties made of a block copolymer formed by rigid crystalline PBT segments and soft amorphous long chain polyether segments. Pibiflex® is particularly suitable for engineering applications where a high profile mix of mechanical, thermal and physical properties is required.

In a possible embodiment, aimed at enhancing the adherence of the covering part on the peripheral edge, the housing seat is constituted by a through hole.

As will become apparent from some of the appended embodiments, the covering part is preferably superimposed on the totality of the peripheral edge.

In this perspective, in order to ensure a stable and durable attachment of the covering part to the retaining edge, and possibly to facilitate the co-moulding procedure, it is preferable to provide a plurality of through holes, distributed evenly on the peripheral edge.

In one embodiment, the peripheral edge has a smaller thickness than the central part of the plate-like element, while the covering part has a thickness at least equal to the central part of the plate-like element.

A tag is obtained wherein all the components are "level", so as to create a tag with two flat faces, without discontinuity areas, in which, for example, dirt can penetrate, spoiling the aesthetic appearance of the tag itself.

In a possible embodiment, the most peripheral part of the covering part may have a slightly greater thickness than the central part of the plate-like element.

In this way, in case there are two tags, one superposed on the other, the metal parts would not be in contact, avoiding the generation of noises during the movement of the tags themselves.

To allow the attachment of the tag object of the present invention to any supporting element, such as a bracelet, a necklace, a collar or the like, the covering part advantageously has a hooking element.

As will become apparent from some exemplary embodiments appended to the present patent application, such a hooking element may be formed in any manner known in the state of the art.

For example, it is possible to provide an eyelet element, combined with a ring.

Alternatively, as will be shown subsequently, it is possible to provide a hooking element constituted by an elongated element connected to the covering part, in such a way as to obtain a sort of attachment strap.

In particular, the elongated element has at its free end an engagement seat adapted to engage with a corresponding engagement tooth provided on said covering part.

Finally, in a further embodiment, the covering part covers the peripheral edge and at least one face of the plate-like element.

BRIEF DESCRIPTION OF THE DRAWINGS

These and other features and advantages of the present invention will become clearer from the following description of some exemplary embodiments illustrated in the attached drawings in which.

DETAILED DESCRIPTION OF EMBODIMENTS OF THE INVENTION

It is specified that the figures attached to the present patent application show some embodiments of the tag object of the present invention in order to better understand its advantages and features.

These embodiments are therefore to be considered as merely illustrative and do not limit the scope of the inventive concept of the present invention, i.e. to provide a tag which has a covering part firmly attached to the plate-like element, so as to provide a seamless surface, with a pleasant aesthetic appearance.

Figure 1:
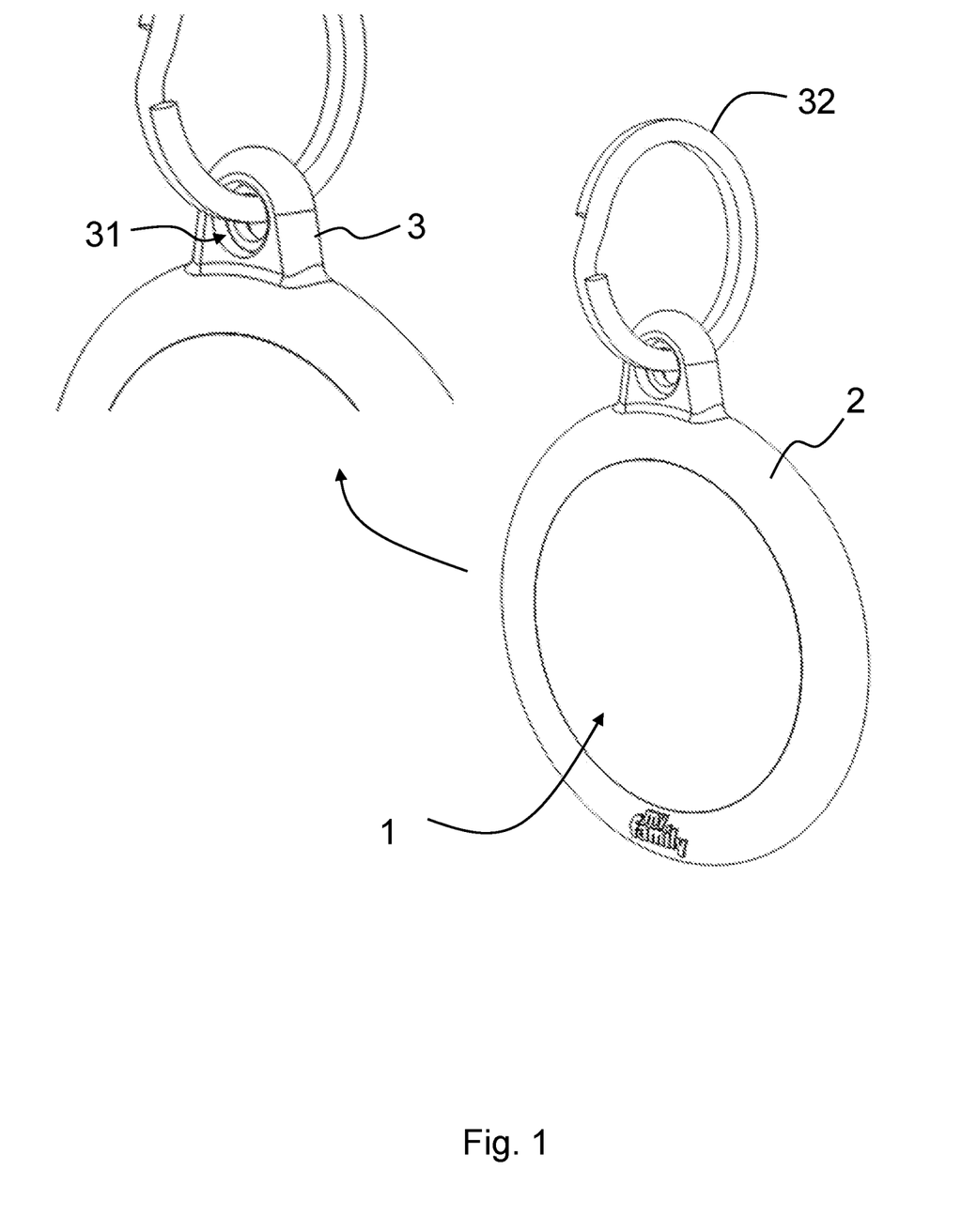
FIG. 1 shows a view of a possible embodiment of the tag object of the present invention.

With particular reference to FIG. 1, the tag object of the present invention provides a plate-like element 1 and a covering part 2.

Figure 2A:
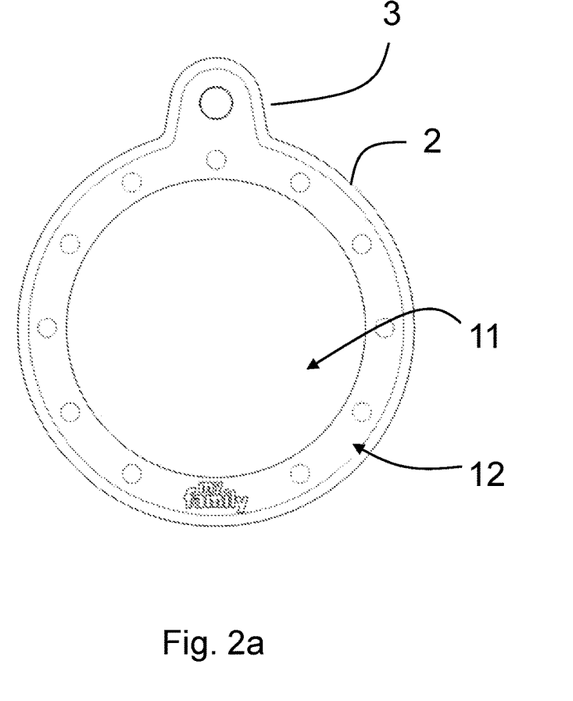
FIGS. 2a-2c respectively show a front view and a sectional view of FIG. 1 and a view of the plate-like element belonging to the tag object of the present invention.
Figure 2B:
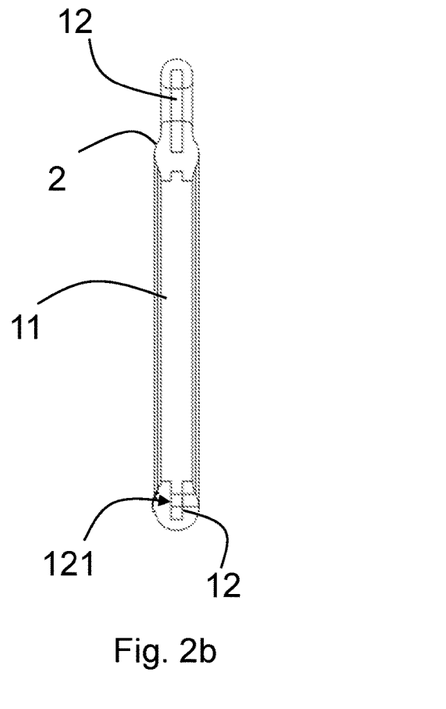
Figure 2C:
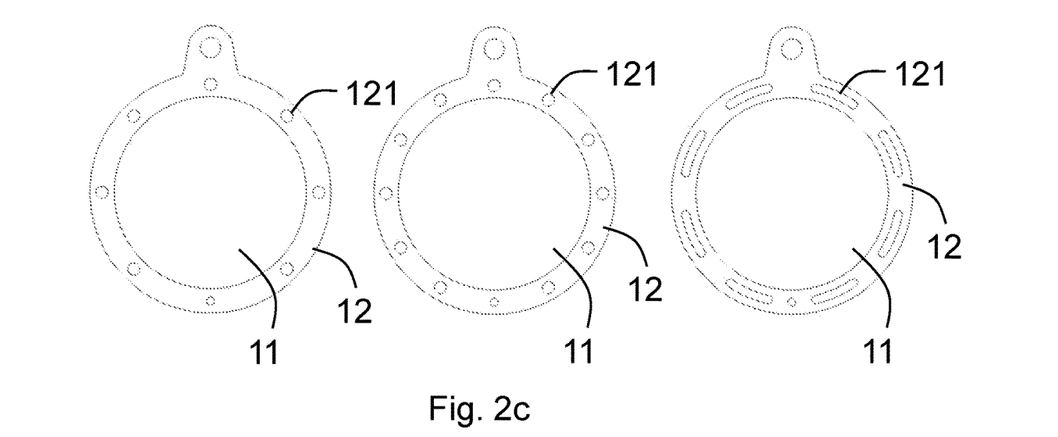

The plate-like element has a peripheral edge 12, visible in FIGS. 2a-2c, and a central part 11.

The peripheral edge 12 is entirely covered by the covering part 2 that is superimposed on the plate-like element at the peripheral edge 12.

In particular, in the variant shown in FIGS. 1-2c, the covering part 2 covers on both sides of the tag the peripheral edge 12 and is firmly attached to it.

Attachment is obtained thanks to the presence of a housing seat provided on the peripheral edge 12, adapted to accommodate the covering part 2.

The housing seat is constituted by a plurality of through holes 121 distributed evenly on the peripheral edge 12.

FIG. 2b shows a section of the tag of FIG. 1 and it is evident that the covering part 2 is superimposed on the central part 11 at both faces of the peripheral edge 12.

By superimposing, the covering part 2 penetrates into the hole 121, so that the coating on the front face (the face towards the left in the figure) of the peripheral edge 12 is in contact with the covering of the rear face (the face towards the right in the figure) of the peripheral edge 12, through the covering housed inside the through hole 121. Figure 2c shows how it is possible to provide different configurations of the through holes 121, distributed evenly on the peripheral edge 12.

As anticipated, the covering part is advantageously made of plastic material, rubber material, preferably having a polymeric matrix, a fluid that has odorous substances or aromatic parts being dispersed within such matrix.

It is evident that the plate-like element 1 is constituted by a central portion 11 and a peripheral edge 12, in such a way that the central part 11 has two faces, a front one and a rear one, on which it is possible to replicate writings, engravings or drawings.

The peripheral edge 12 is instead used for the attachment of the covering part 12 and preferably, with particular reference to FIG. 2b, has a smaller thickness than the central part 11.

In this way, the covering part 2 can cover the peripheral edge 12 with a layer of material with such a thickness as to allow to create a tag which has a front face and/or a rear face with a metal part and a plastic part, which are seamlessly level.

The plate-like element 1 can of course have, for example in the interface area between the central part 11 and peripheral edge 12, further recesses or cavities in addition to the through holes 121, so as to allow the insertion of the covering part 2 during the co-moulding process.

In the variant shown in FIGS. 1 and 2b, the covering part has a slightly greater thickness, so as to provide a surface slightly convex toward the exterior.

The tag shown in FIGS. 1-3c also has a hooking element to a further supporting element, to allow the attachment of the tag to bracelets, necklaces, collars, key chains, or the like.

In this case the hooking element is constituted by an eyelet element 3 which allows the housing of a supporting ring 32, which in turn can be used for attachment to any object.

The eyelet element 3 is integrally made with the covering part 2 so as to form a single covering body that performs both covering and hooking functions.

To avoid damage to the eyelet element 3 due to friction with the ring 32, usually made of metal, it is possible to provide the eyelet element 3 with a metallic core, for example an annular element 31, positioned in the thickness of the eyelet element 3.

This annular element 31 can be made as a single element and inserted in the thickness of the eyelet element 3, or it can be an integral part of the plate-like element 1 and can be integrally made with the peripheral edge 12 of the latter.

The tag illustrated in FIGS. 1-2c has a circular shape, but it is evident that it is possible to provide any shape.

Figures 3A, 3B, 3C:
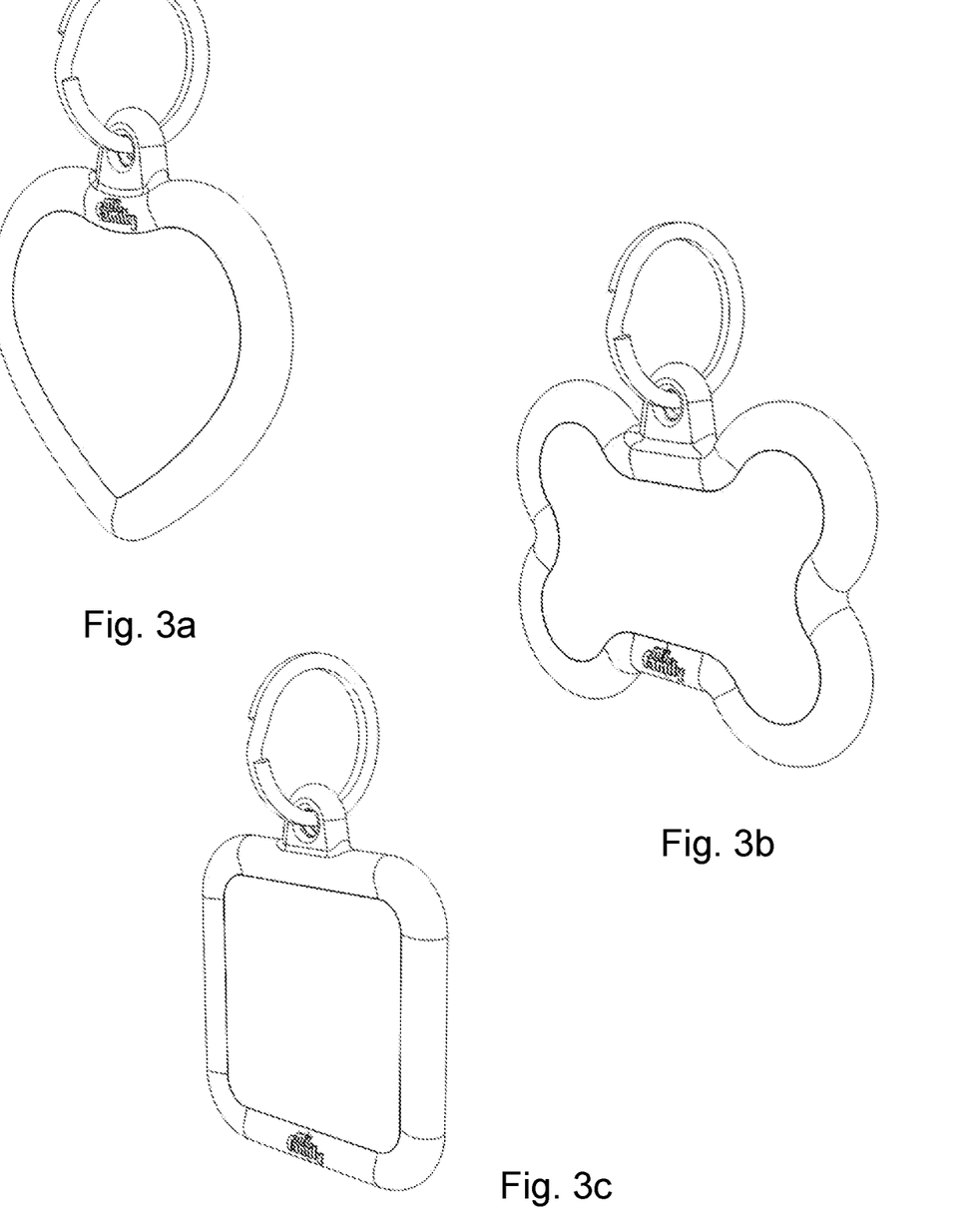
FIGS. 3a-3c show three different embodiments of the tag shown in FIG. 1.

FIGS. 3a-3c show three possible embodiments of the tag of FIG. 1.

FIGS. 4a-6b show a second embodiment of the tag object of the present invention.

This embodiment has the main features of the previously illustrated tag, to which the same considerations apply.

Figure 4A:
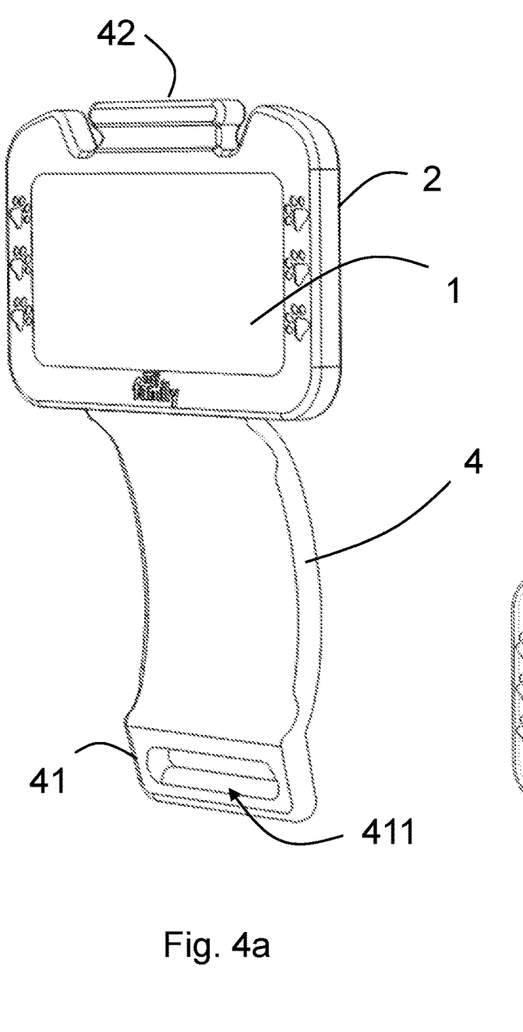
FIGS. 4a and 4b show two views of a further embodiment of the tag object of the present invention.
Figure 4B:
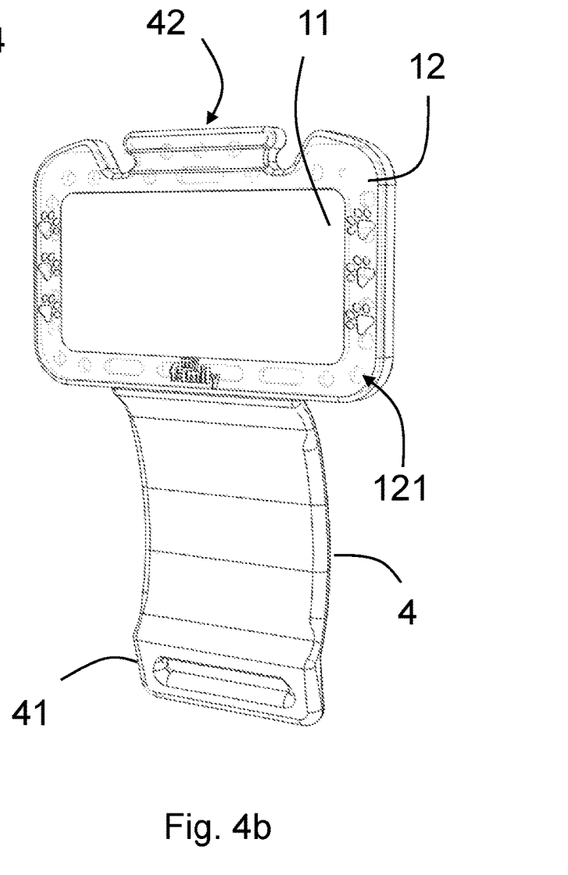

In particular, this second embodiment has a plate-like element 1 consisting of a central part 11 and a peripheral edge 2, in which the peripheral edge 2 is covered with a covering part 2 which is also inserted inside through holes 121 distributed evenly on the peripheral edge 12.

Even in this case, the covering part may be made of plastic material, rubber material, preferably having a polymeric matrix, a fluid that has odorous substances or aromatic parts being dispersed within such matrix.

Unlike the tag of FIG. 1, the tag of FIGS. 4a and 4b has a different hooking element.

In fact, in this case, the hooking element is not constituted by an eyelet, but by an elongated element 4 which, with reference to FIG. 4a, extends in the opposite direction to the plate-like element 11.

This elongated element 4 is connected to the covering part 2 and has at its free end 41 an engagement seat 411 which engages with a corresponding engagement tooth 42.

The engagement tooth 42 is provided on the covering part 2 in the opposite position with respect to the elongated element 4.

Figure 5:
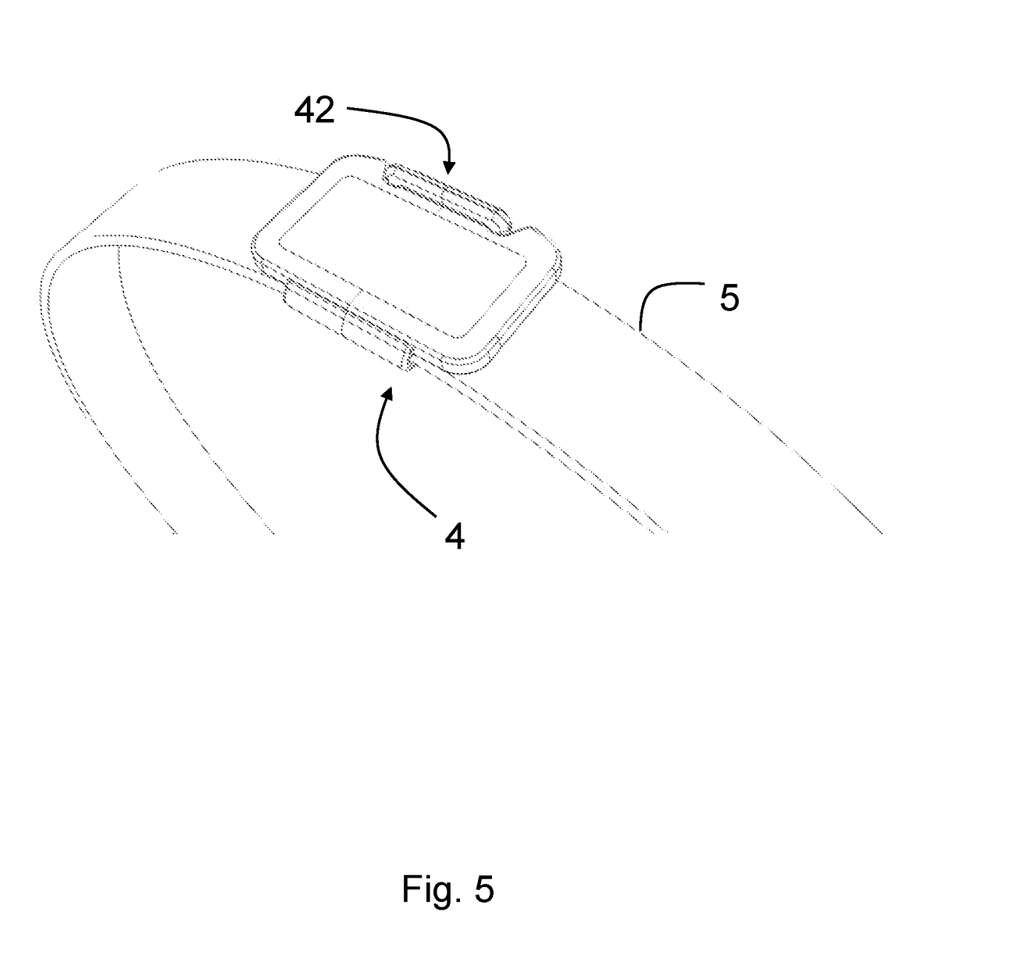
FIG. 5 shows a possible attachment method of the tag of FIGS. 4a and 4b.

The hooking system is clearly illustrated in FIG. 5, wherein the tag is placed on a bracelet or a collar 5, so that the plate-like element remains above the outer surface of the collar 5.

Once the tag is placed on the collar 5, the elongated element 4 is folded in such a way as to enclose the collar 5 and in such a way that the engagement seat 411 is engaged with the engagement tooth 42.

It is obviously possible to provide two or more engagement seats along the length of the elongated element 4, so as to be able to adjust the space between the plate-like element and the folded elongated element 4.

In a preferred embodiment, the elongated element 4 and the engagement tooth 42 are integrally made with the covering part 2.

Moreover, in an embodiment, the covering part 2 can cover the entire peripheral edge 12, but also one of the two faces of the central part 11.

The covering part 2 is therefore provided in the form of a sort of "basin" element that houses the plate-like element 1, leaving only one visible face, preferably the front face of the central part 11 of the plate-like element 1.

The variant of FIGS. 4a-6b may have the same thicknesses of the tag shown in the preceding figures.

If the covering part 2 covers one of the two faces of the plate-like element, in order to ensure stable attachment of the same covering part 2, the thickness of the latter must be greater than the thickness of the plate-like element 1

Finally, also for the variant illustrated in FIGS. 4a and 4b, various shapes and embodiments can be provided.

Figures 6A, 6B:
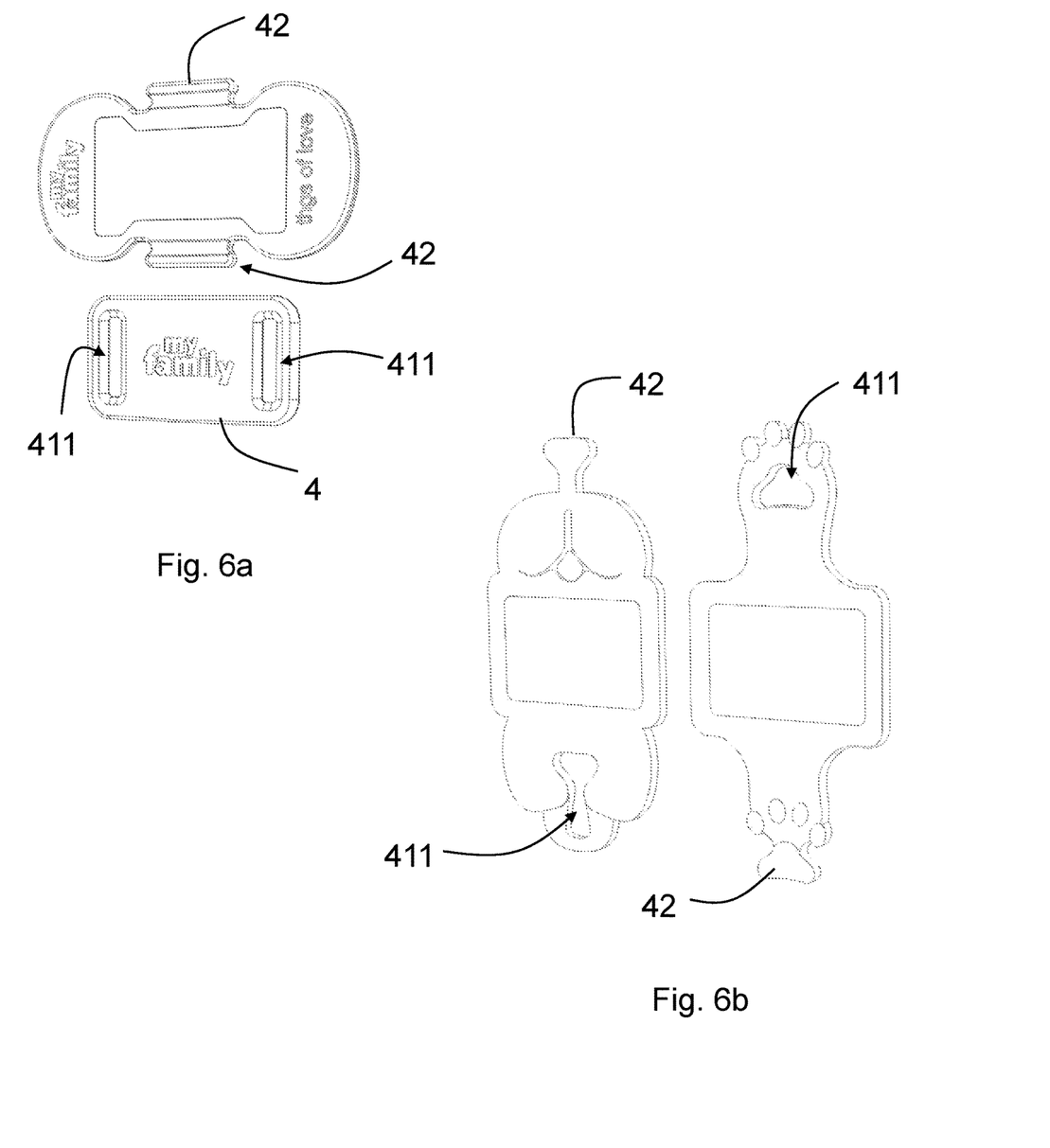
FIGS. 6a and 6b show three different embodiments of the tag illustrated in FIGS. 4a and 4b.

FIGS. 6a and 6b show some exemplary embodiment, wherein different variants of the elongated element 4, of the seat 411 and of the engagement tooth 42 are provided.

The variants shown in FIG. 6b show simple shape changes of the engagement seat 411 and the engagement tooth 42.

The variant of FIG. 6a shows instead a different embodiment of the elongated element 4: the elongated element 4 is not integrally formed with the covering part 2, but it is an element in itself that has two engagement seats 411 which engage with two corresponding engagement teeth 42 provided integrally made with the cover portion 2.

The attachment method of the tag of FIG. 6b is similar to the one shown in FIG. 5.

While the invention can be changed according to different modifications and alternative constructions, some preferred embodiments were shown in the drawings and described in detail.

It should be understood, however, that there is no intention of limiting the invention to the specific illustrated embodiment but, on the contrary, it aims at covering all modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A tag comprising:
    a plate-shaped element; and
    a covering part,
    wherein:
    said plate-shaped element has a central portion and a peripheral edge,
    said covering part is superimposed on said plate-shaped element matching with at least part of said peripheral edge,
    said peripheral edge has at least one housing seat for a portion of said covering part, said housing seat being a through hole, and
    said covering part is superimposed on said plate-shaped element at least at said housing seat.

2. The tag according to claim 1, wherein said plate-shaped element is made from a metallic material, the covering part being made from a plastic material.

3. The tag according to claim 1, wherein said covering part is made of a plastic material comprising a polymeric matrix, a fluid that has odorous substances or aromatic parts being dispersed within such polymeric matrix.

4. The tag according to claim 1, wherein said covering part is made of Pibiflex®.

5. The tag according to claim 1, wherein said peripheral edge has a plurality of through holes distributed evenly along said peripheral edge.

6. The tag according to claim 1, wherein said covering part is superimposed to a totality of said peripheral edge.

7. The tag according to claim 1, wherein said peripheral edge has a smaller thickness than the central portion of the plate-shaped element, said covering part having a thickness at least equal to the central portion of said plate-shaped element.

8. A tag comprising:
    a plate-shaped element and
    a covering part,
    wherein:
    said plate-shaped element has a central portion and a peripheral edge, said covering part is superimposed on said plate-shaped element matching with at least part of said peripheral edge, said peripheral edge has at least one housing seat adapted to receive therein a portion of said covering part, said covering part is superimposed on said plate-shaped element at least at said housing seat, said covering part has a hooking element to a supporting element, and said hooking element is composed of an elongated element connected to said covering part, such elongated element having at a free end an engagement seat adapted to engage a corresponding engagement tooth provided on said covering part.

9. The tag according to claim 8, wherein said plate-shaped element is made from a metallic material, the covering part being made from a plastic material.

10. The tag according to claim 8, wherein said covering part is made of a plastic material comprising a polymeric matrix, a fluid that has odorous substances or aromatic parts being dispersed within such polymeric matrix.

11. The tag according to claim 8, wherein said covering part is made of Pibiflex®.

12. The tag according to claim 8, wherein said housing seat is a through hole.

13. The tag according to claim 12, wherein said peripheral edge has a plurality of through holes distributed evenly along said peripheral edge.

14. The tag according to claim 8, wherein said covering part is superimposed to a totality of said peripheral edge.

15. The tag according to claim 8, wherein said peripheral edge has a smaller thickness than the central portion of the plate-shaped element, said covering part having a thickness at least equal to the central portion of said plate-shaped element.

* * * * *